INVENTOR

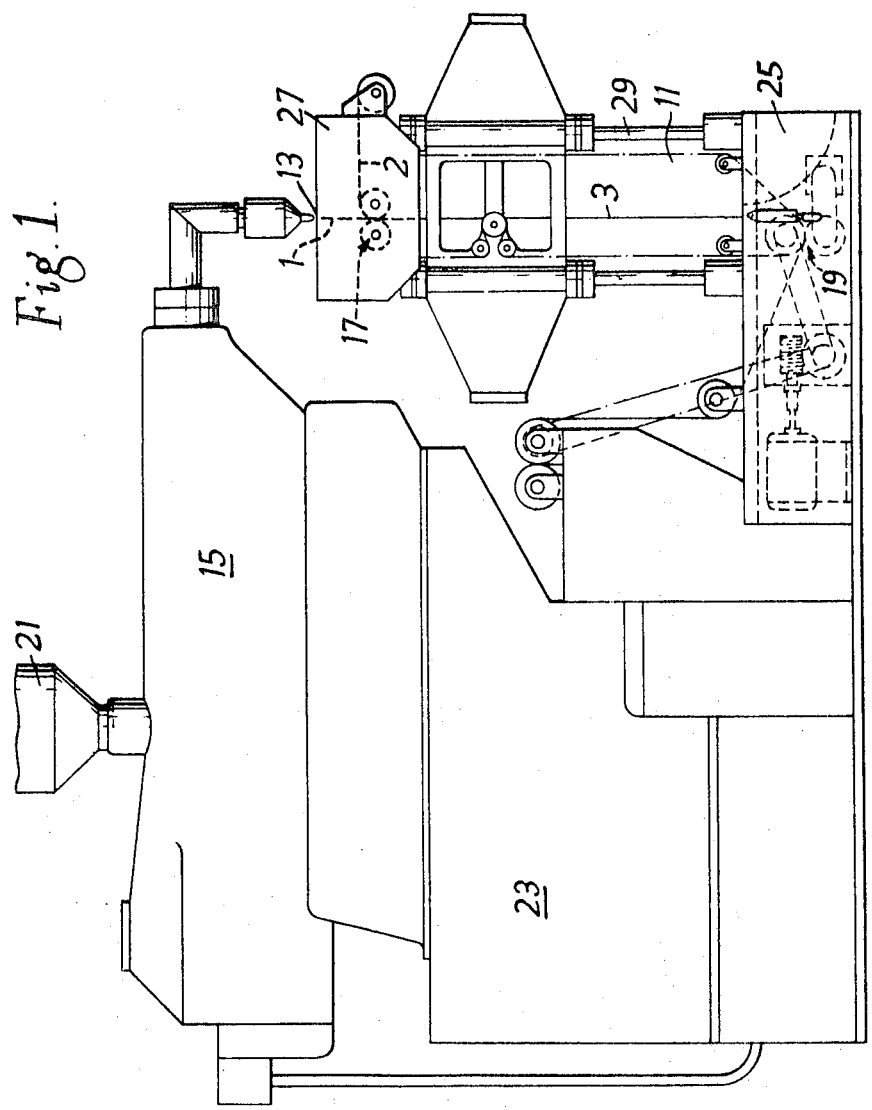

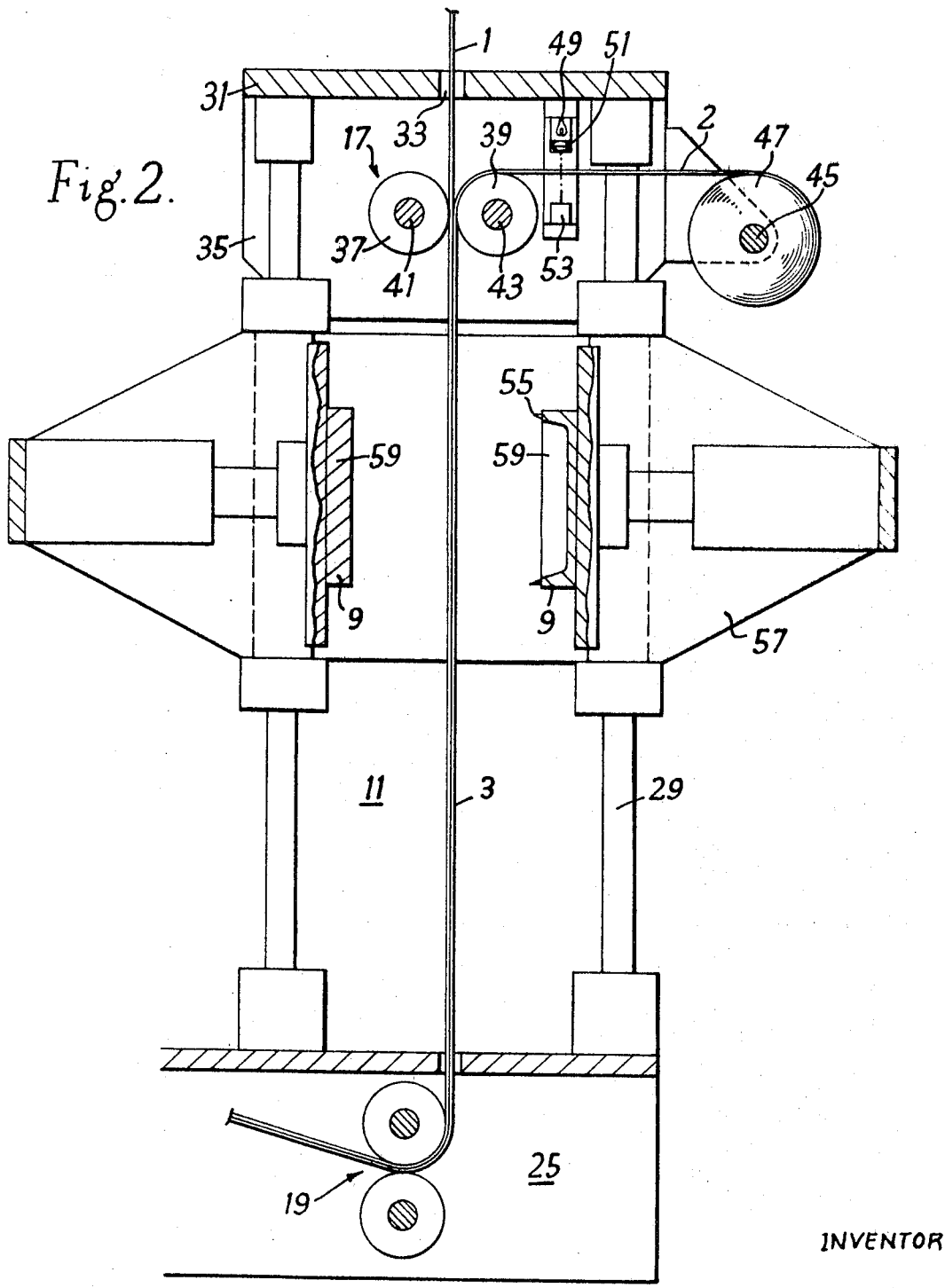

Jack M. Schneider

BY DeLio and Montgomery
ATTORNEYS

United States Patent Office 3,580,773
Patented May 25, 1971

3,580,773
APPARATUS FOR MOULDING ARTICLES FROM PLASTICS MATERIAL
Jack Marvin Schneider, Kingswood, England, assignor to Calmec Extruform Limited
Filed Apr. 19, 1967, Ser. No. 631,959
Claims priority, application Great Britain, Apr. 22, 1966, 17,699/66
Int. Cl. B29f 3/00
U.S. Cl. 156—244                        7 Claims

ABSTRACT OF THE DISCLOSURE

A composite sheet of thermoplastics material is formed by bonding together a first, extruding sheet and a second, preformed sheet of cheaper material. The second sheet has a series of identification marks printed thereon at locations spaced lengthwise of the sheet and a series of register marks. Articles are formed by feeding the composite sheet from the bonding means to an article-forming apparatus. Means are provided for detecting the arrival of a register mark at a predetermined location on the path of the second or the composite sheet and controlling the operation of the article-forming apparatus so that each article bears an identification mark at a predetermined location thereon.

BACKGROUND OF THE INVENTION

This invention relates to the formation of composite sheets of thermoplastics material and to the making of articles from these composite sheets.

Packages for perishable goods such as food or cigarettes are advantageously made from thermoplastics material but a difficulty then arises in printing information concerning the goods or any other identification mark on the packages.

STATEMENTS OF THE INVENTION

The present invention includes a method of forming a composite sheet of thermoplastics material comprising drawing a first sheet of thermoplastics material emerging from the outlet of an extrusion apparatus into a predetermined path at a predetermined rate, drawing a second sheet of thermoplastics material into the path at a rate sensibly equal to the predetermined rate and in such manner that the two sheets are disposed in flatwise engagement, the second sheet being formed with a series of detectable register means respectively disposed at locations equally or substantially equally spaced lengthwise of the sheet, and bonding together the two sheets to form a composite sheet.

The invention also includes a method of forming articles from thermoplastics material comprising drawing a first sheet of thermoplastics material emerging from the outlet of an extrusion apparatus into a predetermined path at a predetermined rate, drawing a second sheet of thermoplastics material into the path at a rate sensibly equal to the predetermined rate and in such manner that the two sheets are disposed in flatwise engagement, the second sheet being formed with a series of detectable register means respectively disposed at locations equally or substantially equally spaced lengthwise of the sheet, bonding together the two sheets to form a composite sheet, detecting the arrival of a register means at a predetermined location, which arrival corresponds to the arrival at a predetermined position on the said path of a predetermined section of the composite sheet, and, upon detection of the second register means, engaging the said section by tool means to form an article therefrom.

The detectable register means may consist of printed information or some other identification mark which is required on the formed article. In this case the detecting means are so arranged that arrival of one register means at the predetermined location corresponds to arrival of a section of the composite sheet bearing a further register means at the predetermined position relative to the tool means.

Alternatively, the register means may consist of a series of marks or apertures additional to the printed information or other identification mark required on the formed article. In this case the second sheet is provided with a series of register means and a series of identification marks so arranged that arrival of a register means at the predetermined location corresponds to arrival of a section of the composite sheet bearing an identification mark at the predetermined position relative to the tool means.

The invention also includes apparatus for forming articles from thermoplastics material, comprising means for engaging a first sheet of thermoplastics material emerging from the outlet of an extrusion apparatus and drawing the sheet into a predetermined path at a predetermined rate, means for drawing a second sheet of thermoplastics material into the path at a rate sensibly equal to the predetermined rate and in such manner that the two sheets are disposed in flatwise engagement, the second sheet being formed with a series of detectable register means respectively disposed at locations equally or substantially equally spaced lengthwise of the sheet, means for bonding together the two sheets to form a composite sheet, co-operable tool means adapted to engage the composite sheet and to form an article therefrom, means for detecting the arrival of a register means at a predetermined location, which arrival corresponds to the arrival at a predetermined position relative to the tool means of a predetermined section of the composite sheet, and control means adapted, upon detection of a register means by the detecting means, to cause the tool means to engage the said section and to form an article therefrom.

Preferably, the apparatus includes means for advancing the tool means, upon engagement thereof with a section of the composite sheet, along the said path at a rate sensibly equal to the rate of travel of the composite sheet, means for releasing the tool means from the section after travel through a predetermined distance, whereby the section retains its formed shape, and means for rapidly returning the tool means along the path for engagement with a succeeding section of the composite sheet.

The invention will now be described, by way of example, with reference to the accompanying drawings, in which:

FIG. 1 is a general arrangement view showing in side elevation an apparatus according to the invention for forming articles from thermoplastics material;

FIG. 2 is a side elevation of parts of the apparatus of FIG. 1; and

Figure 3A:
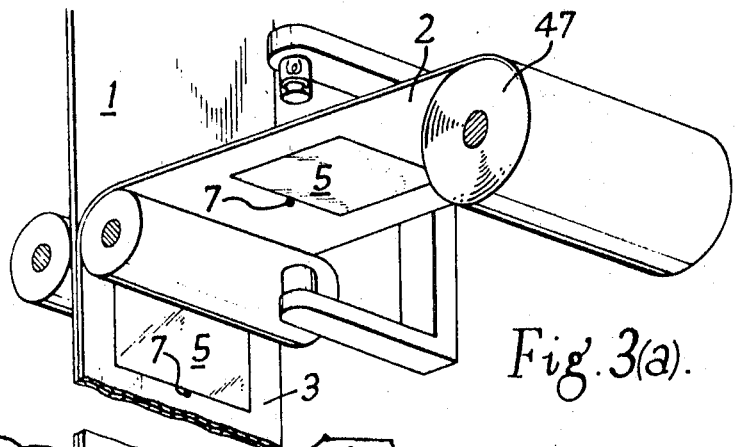
Figure 3B:
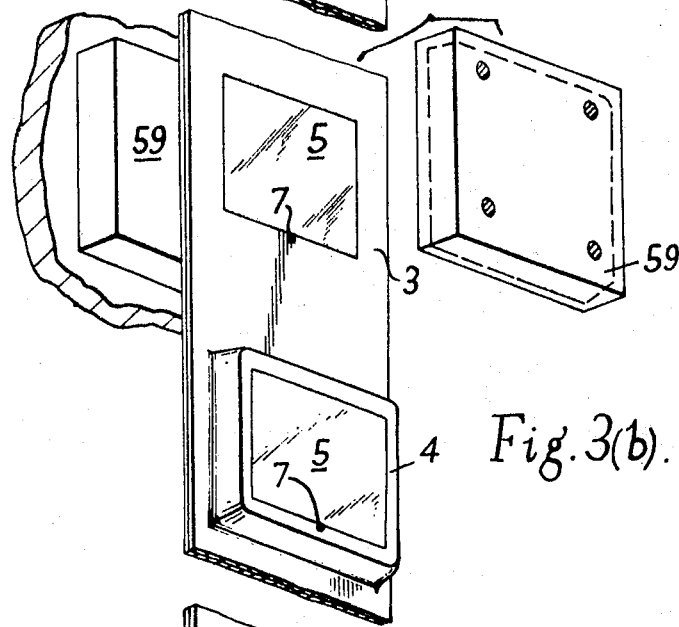
Figure 3C:
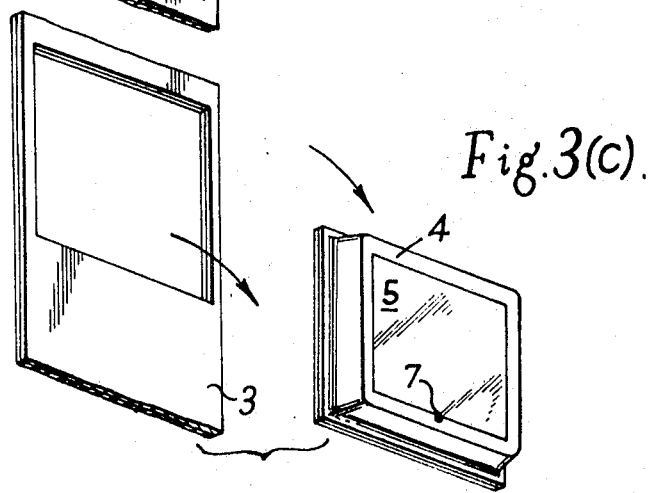

FIGS. 3(a) to (c) show different stages during the bonding together of two thermoplastics sheets and formation of an article by the apparatus of FIGS. 1 and 2.

The apparatus shown in FIGS. 1 and 2 of the drawings is for making articles in the form of open-topped containers for food which have information concerning the contents of the container or some other identification mark printed thereon.

Referring to FIGS. 3(a) to (c), containers 4 are made from a composite sheet 3 which is formed by bonding together a first, extruded sheet 1 of thermoplastics material and a second, pre-printed sheet 2 of cheap and thinner thermoplastics material. Suitably the sheet 1 is rubberised polystyrene and the sheet 2 is clear polystyrene. The sheet 2 has a series of identification marks 5 printed thereon at locations which are equally or substantially equally spaced lengthwise of the sheet and is also formed with a series of register marks 7 which are likewise equally or substantially equally spaced lengthwise of the sheet. The register 7 marks serve as detectable register means, as hereinafter described, there being one register mark associated with, and disposed in a predetermined position relative to, each identification mark 5. Successive register marks 7 are therefore spaced along the sheet 2 by an amount equal to the spacing of successive identification marks 5.

Referring to FIGS. 1 and 2, the apparatus is of the kind described in co-pending cognate applications Nos. 16,731/64, U.S. 3,271,816, and 42,903/64, U.S 3,267,523, and broadly comprises tool means 9 reciprocably mounted on an elongated supporting structure 11 which, when disposed close to the outlet 13 of an extrusion apparatus 15, provides a path along which the tool means can be reciprocated towards and away from the said outlet, means generally indicated at 17 and 19 for driving material emerging from the said outlet along the path provided by the supporting structure 11, means for causing the tool means to engage and thereby effect a forming operation on a section of heated material close to the said outlet, means for advancing the engaged tool means along the said path in a direction away from the said outlet and at a rate sensibly equal to the rate of supply of material therefrom, means for releasing the tool means from the section after travel through a predetermined distance, whereby the section retains its formed shape, and means for rapidly returning the tool means along the path to their initial position for engagement with a succeeding section of material.

More specifically, the apparatus includes a conventional extruding apparatus 15 having a heating chamber, a hopper 21 for the supply of powdered thermoplastics material to an inlet of the heating chamber, and a screw for conveying heated material from the chamber and forcing the material through an extruding die at the outlet 13 of the apparatus to form a sheet 1. The extruding apparatus 15 is mounted on a framework 23 with the extruding die so arranged that the extruded sheet 1 is moving downwardly as it emerges from the outlet 13 thereof.

The apparatus according to the invention is provided with an upright supporting structure 11 which, when arranged beneath the outlet 13 of the extrusion apparatus 15, defines a downwardly extending path for the heated sheet 1 emerging therefrom. The supporting structure 11 includes a substantial base 25 and a supporting head 27 which is mounted on the base, immediately below the outlet 13 of the extrusion apparatus 15, by means of four upstanding pillars 29.

The head 27 of the supporting structure 11 comprises a top plate 31 which is mounted on the upper ends of the pillars 29 and is formed with a central aperture 33 for the downwardly moving sheet 1 of extruded material. Side plates 35 of the head extend downwardly from the top plate 31.

The driving means 17 include upper driving rollers 37 and 39 which are respectively located on opposed sides of the sheet 1 and are mounted on parallel shafts 41 and 43, respectively. The shafts 41 and 43 are journalled in bearings (not shown) supported by respective side plates 35, the housing of the bearings for shaft 41 being fixedly secured to respective side plates whilst the housings of the bearings for shaft 43 are movable by air pressure-operated means (not shown) to vary the spacing between rollers 37 and 39.

A spindle 45 for supporting a roll 47 of the second sheet 2, of pre-printed material is also supported by side plates 35 of the head 27, the spindle 45 being disposed on one side of the extruded sheet 1 at approximately the same vertical location as the axes of the driving rollers 37 and 39. The sheet 2 can therefore be fed substantially horizontally from the roll 47 into engagement with an upper part of the driving roller 39 and then downwardly, between rollers 37 and 39, in flatwise engagement with the extruded sheet 1.

For purposes hereinafter described a source 49 of light is disposed above the horizontal run of the sheet 2 and an optical system 51 projects a narrow beam of light from the source downwardly towards a photoelectric cell 53 below the sheet 2. The light source 49 and the photoelectric cell 53 are so arranged that light from the source is normally transmitted through the transparent sheet 2 to the cell but is prevented from reaching the cell when one of the register marks 7 is collinear with the source and the cell. Associated with the light source 49 and photoelectric cell 53 is an electrical control circuit, as hereinafter described.

The tool means 9 for forming a container 4 from a section of the composite sheet 3 bearing an identification mark 5 and cutting means 55 for detaching the container at the end of a forming operation are mounted on a carriage 57 which is movable upwardly and downwardly on the supporting structure 11, parallel with the path of the sheet 3. The tool means 9 include tool elements 59 which are disposed on respective opposite sides of the composite sheet 3 and are movable laterally of the sheet from retracted positions, in which they are spaced from the sheet, to article forming positions, in which they engage a section of heated sheet material therebetween. The cutting means 55 include knives which are fixedly secured relative to one of the tool elements 59 and are arranged to contact one surface of the composite sheet 3, along the periphery of the container 4 formed in a sheet section, when the tool elements are in their engaged positions. At the end of a forming operation an increased pressure is applied to the tool elements 59, causing them to be urged together more strongly so that the knives are forced into engagement with facing parts of the opposed tool element and, in so doing, pierce the sheet 3 and sever the formed container 4 therefrom.

To ensure that each container 4 formed from a section of the composite sheet 3 has an identification mark 5 in a desired location thereon the apparatus shown in FIGS. 1 and 2 is provided with a hydraulic circuit which is essentially the same as the circuit described in co-pending applications Nos. 16,731/64, U.S. 3,271,816, and 42,903/64, U.S. 3,267,523. The hydraulic circuit of these applications is modified, however, so that when the carriage 57 approaches its uppermost position and operates the third microswitch of the electrical control circuit the valve V3 is moved into a condition wherein the carriage is brought to rest. It is only when a register mark 7 on the sheet 2 reaches a position collinear with the light source 49 and the photoelectric cell 53, causing the electrical control circuit associated with the photocell to generate an electrical signal which effects further operation of the third microswitch, that valve V3 is moved into a condition wherein the carriage is caused to descend.

In use of the apparatus of FIGS. 1 and 2, the heaters of the extrusion apparatus 15 are switched on and powdered, rubberised polystyrene is supplied to the inlet thereof. Sheet 1 is extruded from the outlet 13 of the extrusion apparatus 15 and drawn downwardly into a predetermined vertical path within the supporting structure 11 by the upper driving rollers 37 and 39.

A roll 47 of clear polystyrene sheet material having a thickness of approximately 0.001 inch and having the abovementioned series of identification marks 5 and register marks 7 printed thereon is mounted on the spindle 45 and one end of the roll is fed over the driving roller 39 and then downwardly between the driving rollers 37 and 39, as described above.

The position of the roller 39 is adjusted so that the extruded sheet 1 and the sheet 2 from the roll 47 are gripped between the rollers 37 and 39 in flatwise engagement with one another.

The pressure exerted on the sheets 1 and 2 as they pass between the rotating driving rollers 37 and 39 is so arranged that the cold sheet 2 of thin material is bonded to the hot, extruded sheet 1 to form the composite sheet 3.

Operation of the extrusion apparatus 15 and the speed of rotation and pressure exerted by the upper driving rollers 37 and 39 are adjusted to provide a sheet 1 having a thickness of approximately 0.015 to 0.090 inch and a composite sheet 3 which is travelling at a predetermined rate when it emerges from the upper driving rollers.

Formation of containers 4 from the composite sheet 3 is effected in the manner described in co-pending applications Nos. 16,731/64, U.S. 3,271,816, and 42,903/64, U.S. 3,267,523, except for the above-mentioned modification which ensures that the section of composite sheet from which a container is formed bears an identification mark 5 at a predetermined location thereon.

In this connection it will be appreciated that when a register mark 7 on the sheet 2 from the roll is collinear with the light source 49 and the photoelectric cell 53 the section of composite sheet 3 which is to be engaged by the tool elements 59 on the carriage 57 must still be in a position slightly above a position in which it is in register with the tool elements. During the interval between the generation of an electrical signal by the circuit associated with the photoelectric cell 53 and acceleration of the carriage 57 from rest to a speed equal to the rate of movement of the composite sheet 3 the latter moves downwardly relative to the carriage so that the desired section of the sheet is in register with the tool elements.

It will be apparent that the above-described apparatus can be modified by providing an additional pair of rollers for bonding together the sheets 1 and 2 and using the upper driving rollers 37 and 39 only for drawing the sheet 1 downwardly from the extrusion apparatus 15. In this case the bonding rollers are mounted below the driving rollers 37 and 39 and are driven at peripheral speeds equal to the peripheral speeds of rollers. Sheet 1 of extruded material is fed downwardly to the bonding rollers by the driving rollers 37 and 39 whilst sheet 2 from roll 47 is fed over one of the bonding rollers and then downwardly between the bonding rollers, in flatwise engagement with the sheet 1.

Use of the above apparatus enables containers 4 to be manufactured continuously from a sheet 1 emerging from the outlet of an extrusion apparatus. In addition, by bonding to the extruded sheet 1 a thin sheet 2 of relatively cheap material which has already been printed with identification marks 5 it is possible to avoid the necessity of printing on to the finished containers 4.

These parts of the composite sheet 3 which are not formed into containers 4 emerge from the lower driving means 19 and are then passed to a granulator for return to an inlet of the extrusion apparatus 15. The difference between the amount of rubber compound included in these parts of the composite sheet 3 and the sheet 1 which is initially extruded is not sufficient to affect the properties of sheet material subsequently extruded.

I claim:

1. A method of forming articles from thermoplastics materials comprising drawing a first sheet of thermoplastics material emerging from the outlet of an extrusion apparatus into a predetermined path at a predetermined rate, drawing a second, preformed, sheet of thermoplastics material into the path at a rate sensibly equal to the predetermined rate and in such manner that the two sheets are disposed in flatwise engagement, the second sheet being formed with a series of detectable register means respectively disposed at locations equally or substantially equally spaced lengthwise of the sheet, bonding together the two sheets to form a composite sheet, detecting the arrival of a register means at a predetermined location, which arrival corresponds to the arrival at a predetermined position on the said path of a predetermined section of the composite sheet, and upon detection of the said register means, engaging the said section by tool means to form an article therefrom.

2. A method as claimed in claim 1 comprising drawing the first sheet downwardly from the outlet of the extrusion apparatus into a predetermined vertical path and drawing the second sheet in a horizontal or inclined direction from a supply roll into the said vertical path.

3. A method as claimed in claim 1, wherein the first sheet is rubberised polystyrene and the second sheet is clear polystyrene.

4. Apparatus for forming articles from thermoplastics material, comprising means for engaging a first sheet of thermoplastics material emerging from the outlet of an extrusion apparatus and drawing the sheet into a predetermined path at a predetermined rate, means for drawing a second, preformed, sheet of thermoplastics material into the path at a rate sensibly equal to the predetermined rate and in such manner that the two sheets are disposed in flatwise engagement, the second sheet being formed with a series of detectable register means respectively disposed at locations equally or substantially equally spaced lengthwise of the sheet, means for bonding together the two sheets to form a composite sheet, co-operable tool means adapted to engage the composite sheet and to form an article therefrom, means for detecting the arrival of a register means at a predetermined location, which arrival corresponds to the arrival at a predetermined position relative to the tool means of a predetermined section of the composite sheet, and control means adapted, upon detection of a register means by the detecting means, to cause the tool means to engage the said section and to form an article therefrom.

5. Apparatus as claimed in claim 4, including means for advancing the tool means, upon engagement thereof with a section of the composite sheet, along the said path at a rate sensibly equal to the rate of travel of the composite sheet, means for releasing the tool means from the section after travel through a predetermined distance, whereby the section retains its formed shape, and means for rapidly returning the tool means along the path for engagement with a succeeding section of the composite sheet.

6. Apparatus as claimed in claim 4, wherein the detecting means include a source of light, a photosensitive element, and means for projecting light from the source to the element via the predetermined location, whereby arrival of a register means at the said predetermined location causes a change in the intensity of light falling on the element.

7. Apparatus as claimed in claim 6, wherein the source and the photosensitive element are so arranged that to reach the element light from the source must be transmitted through a portion of the second sheet or the composite sheet at the predetermined location.

References Cited

UNITED STATES PATENTS

| | | | |
|---|---|---|---|
| 2,358,176 | 9/1944 | MacDonald | 156—501X |
| 3,024,147 | 3/1962 | Brooks et al. | 156—252X |
| 3,146,492 | 9/1942 | Lemelson | 156—500UX |
| 3,159,698 | 12/1964 | Suh et al. | 18—19(P)UX |
| 3,172,571 | 3/1965 | Marchak | 156—500UX |
| 3,459,625 | 8/1969 | Heller, Jr., et al. | 156—500X |
| 3,475,878 | 11/1969 | West, Jr. | 18—19(P)X |

FOREIGN PATENTS

| | | | |
|---|---|---|---|
| 715,530 | 8/1965 | Canada | 156—244 |

BENJAMIN R. PADGETT, Primary Examiner

H. E. BEHREND, Assistant Examiner

U.S. Cl. X.R.

156—378, 500